(12) United States Patent
Cipriani

(10) Patent No.: US 7,760,367 B2
(45) Date of Patent: Jul. 20, 2010

(54) APPARATUS AND METHOD FOR CHECKING POSITION AND/OR SHAPE OF MECHANICAL PIECES

(75) Inventor: Riccardo Cipriani, Ferrara (IT)

(73) Assignee: Marposs Societa'per Azioni, Bentivoglio (IT)

( * ) Notice: Subject to any disclaimer, the term of this patent is extended or adjusted under 35 U.S.C. 154(b) by 272 days.

(21) Appl. No.: 11/885,765

(22) PCT Filed: Mar. 13, 2006

(86) PCT No.: PCT/EP2006/060655

§ 371 (c)(1),
(2), (4) Date: Sep. 6, 2007

(87) PCT Pub. No.: WO2006/097445

PCT Pub. Date: Sep. 21, 2006

(65) Prior Publication Data

US 2008/0195352 A1    Aug. 14, 2008

(30) Foreign Application Priority Data

Mar. 14, 2005  (IT) .......................... BO2005A0146

(51) Int. Cl.
*G01B 11/24* (2006.01)
(52) U.S. Cl. ..................................... 356/601
(58) Field of Classification Search ................ 356/601, 356/609, 384, 387, 383
See application file for complete search history.

(56) References Cited

U.S. PATENT DOCUMENTS

| 5,841,542 | A | 11/1998 | Milana et al. |
| 6,141,106 | A * | 10/2000 | Blum ......................... 356/635 |
| 7,119,895 | B2 * | 10/2006 | Otsuka et al. .......... 356/139.04 |
| 7,221,462 | B2 * | 5/2007 | Cavallucci .................. 356/614 |
| 7,227,163 | B2 * | 6/2007 | Johnson ................. 250/559.24 |
| 2004/0027562 | A1 | 2/2004 | Otsuka et al. |

FOREIGN PATENT DOCUMENTS

GB    2183820    6/1987

\* cited by examiner

*Primary Examiner*—Tarifur R. Chowdhury
*Assistant Examiner*—Isiaka O Akanbi
(74) *Attorney, Agent, or Firm*—Dickstein Shapiro LLP

(57) ABSTRACT

An apparatus for checking mechanical pieces comprises a base (1), a locking and reference system (31), an optoelectronic measuring system (53), displacement systems (3, 9, 26) and a processing unit (25) for receiving and processing the signals of the optoelectronic system. The displacement systems also enable mutual translation displacements, along a transversal axis, between the optoelectronic system and the piece to be checked. A method of checking foresees to detect signals provided by the optoelectronic system relating to a surface (51) of the piece in the course of the mutual oscillations, at at least two different transversal positions (A, B), and carry out a processing in order to obtain information relating to a virtual surface (51'). The method and the apparatus enable to obtain information relating to the position and/or the arrangement and/or the shape of even very small-dimensioned component parts of hard disk storage units.

21 Claims, 5 Drawing Sheets

APPARATUS AND METHOD FOR CHECKING POSITION AND/OR SHAPE OF MECHANICAL PIECES

TECHNICAL FIELD

The present invention relates to an optoelectronic apparatus for checking position and/or shape of a mechanical piece, comprising a base, a locking and reference system for the piece to be checked, detecting devices with an optoelectronic system for providing signals indicative of the position of at least some parts of the piece to be checked, a rotating system enabling rotation displacements between the optoelectronic system and the piece to be checked about a longitudinal axis of rotation, and a processing unit adapted for receiving the signals of the optoelectronic system and providing information relating to the position and/or the shape of the piece to be checked.

The invention also relates to a method for checking the position and/or shape errors of a mechanical piece, by means of an apparatus including a locking and reference system for the piece to be checked, detecting devices for providing signals indicative of the position of at least parts of the piece to be checked, and driving devices between the locking and reference system and the detecting devices, the method including the steps of causing rotation displacements between the locking and reference system and the detecting devices about an axis of rotation, and processing signals provided by the detecting devices in the course of the rotation displacements in order to obtain information relating to the position and/or the shape of the piece to be checked.

BACKGROUND ART

The invention is particularly suitable for checking mechanical pieces with extremely small dimensions, like component parts of hard disk storage units. Such units include magnetic read/write heads—for reading/writing information on disks—coupled to extremely small-dimensioned sliders, for example in the order of the millimeter or even less. Stationary supports carry, by means of an elastic coupling, the sliders that make the magnetic head "float" over the surface of the associated disk when the latter is driven into rotation, for example by an electric motor. The rotation of the disks and the specific shape of the sliders generate a lift that tends to displace the sliders and the magnetic heads away from the surfaces of the associated disks, opposing the force applied by the elastic coupling. The balancing of the elastic coupling force and of the lift allows the magnetic heads to position themselves at a practically constant height over their associated disk. In order to achieve a correct read/write process, it is very important that the slider be arranged in the right attitude so the proper lift be generated and thus the proper height of the head over the disk surface, typically between approximately 5 and 50 nm, be obtained.

In industry the trend is to manufacture ever smaller hard disks, the latter being utilized even in extremely small-dimensioned devices, like photo camera and digital video camera apparatuses. As a consequence the dimensions of the sliders and those of the other component parts, that must obviously maintain and improve the high quality and reliability features, are extremely reduced.

European patent EP-1029219-B1 discloses an optoelectronic apparatus for the dimension and/or shape error checking of mechanical pieces with complex shape, for example supports with a plurality of wings (or "E-blocks") for magnetic read/write heads of a hard disk. The apparatus includes, among other things, a system for locking and referring the piece to be checked and detecting devices including an optoelectronic system, for example of the known shadow casting type. The piece to be checked and the optoelectronic system can accomplish, amongst other things, relative rotation displacements about a longitudinal axis. The optoelectronic system includes a light emitter, for example in the infrared wave length, transversal to the longitudinal axis and directed towards a receiver, for example of the photosensitive CCD ("Charge Coupled Device") type. The support for magnetic heads to be checked is positioned between emitter and receiver and intercepts a portion of light emitted by the emitter during small clockwise and counterclockwise rotation displacements (swingings) performed by the optoelectronic system. As described in EP-1029219-B1 it is possible to detect geometric and shape features of the piece, relating, for example, to the position of some parts with respect to a mechanical reference, by suitably processing the signal provided by the receiver. The amount of the variation, in the course of the rotation, of the portion of light intercepted by the part to be checked determines the "dynamics" of the signal provided by the receiver. As the dimensions, more specifically the transversal dimensions, of the part to be checked and of the swinging angle of the optoelectronic system decrease, the variations of the intercepted light and, as a consequence, the dynamics of the signal decrease. If the dimensions of the part to be checked are very small (for example less than a millimeter) and the swinging angle is limited, for example by physical features of the specific application, the limited dynamics of the processed signal may not guarantee the achieving of reliable results, even in consideration of unavoidable optical noises whose negative influence increases as the dynamics of the useful signal decreases.

The apparatus according to patent EP-1029219-B1 can be utilized for checking the arrangement and other features of sliders for hard disks, but if the transversal dimensions of the sliders are considerably small, there can occur the previously mentioned problems of scarce reliability.

DISCLOSURE OF THE INVENTION

An object of the present invention is to provide an optoelectronic apparatus for checking geometrical features of mechanical parts that enables to obtain accurate and reliable results even when the parts to be checked, for example sliders for hard disks, have particularly small dimensions.

This and other objects and advantages are achieved by an apparatus according to claim 1 and by a method according to claim 14.

The apparatus according to the present invention includes, amongst other things, a base carrying a rotating system for rotation about a longitudinal axis of rotation, a transversal translation system that defines a translation axis transversal with respect to the longitudinal axis, a locking and reference system for a mechanical piece to be checked and an optoelectronic measuring system. Operating in accordance with the method of the present invention, the apparatus enables the piece to be checked and the optoelectronic measuring system to perform mutual translations along the translation axis and mutual rotations about the axis of rotation.

BRIEF DESCRIPTION OF THE DRAWINGS

The usefulness of the displacements along the translation axis and other advantageous aspects of the present invention will become clear from the following detailed description and the accompanying drawings, given by way of non limiting example only, wherein.

BEST MODE FOR CARRYING OUT THE INVENTION

Figure 1:
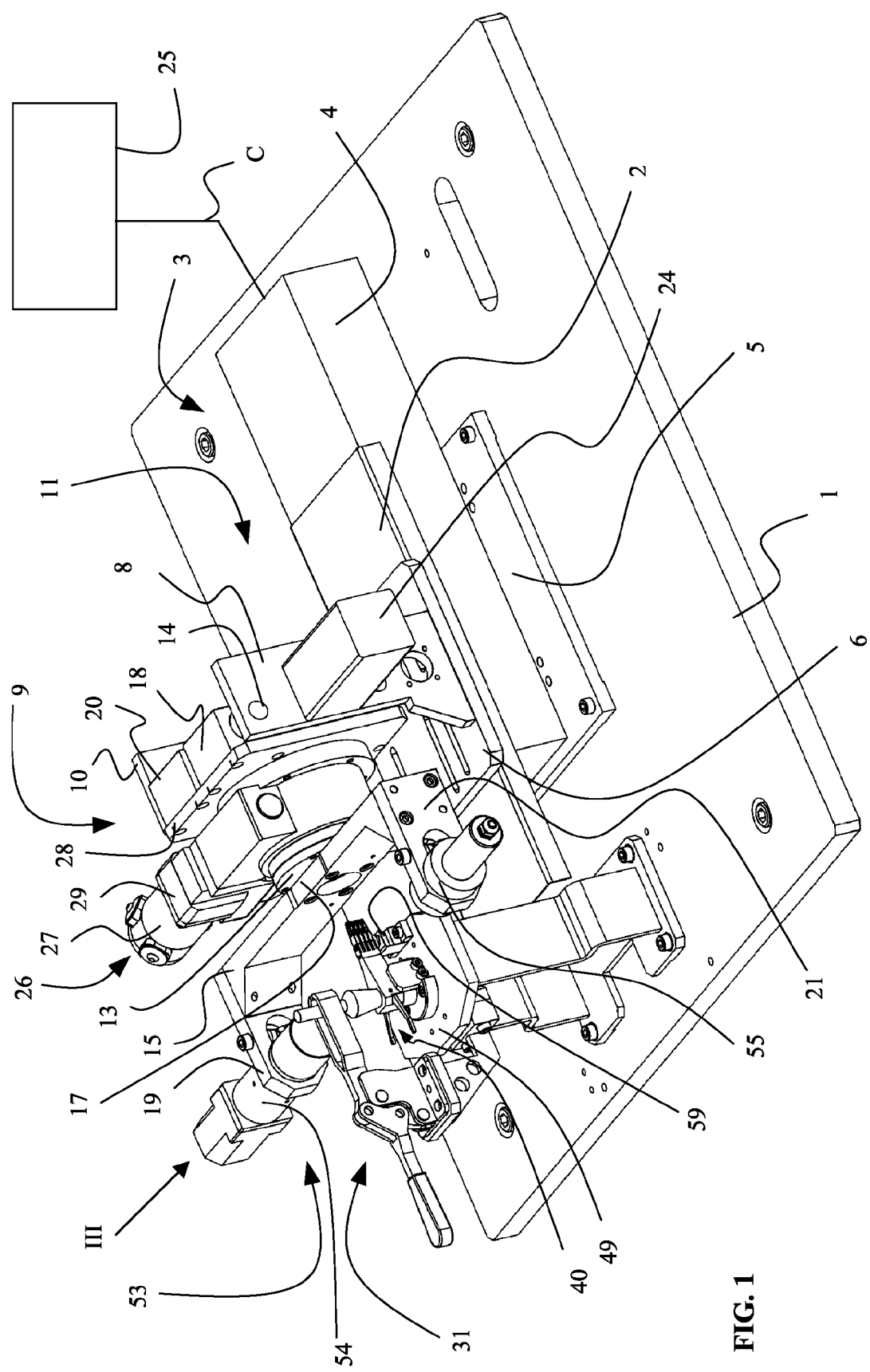
FIG. 1 is a perspective view of an apparatus according to a preferred embodiment of the invention.
Figure 2:
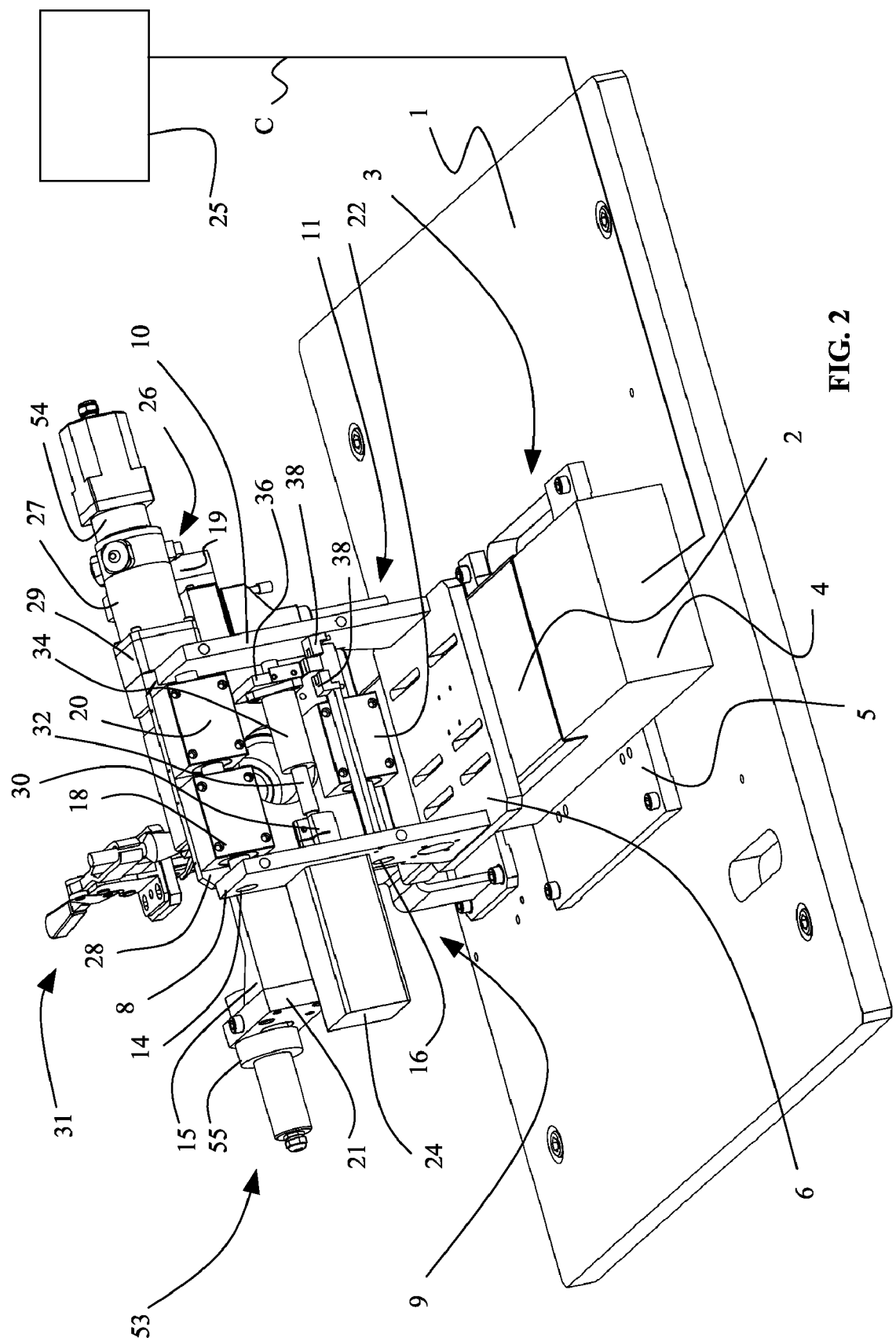
FIG. 2 is a perspective view, according to a different angular position, of the apparatus of FIG. 1.

The optoelectronic apparatus shown in FIGS. 1-2 is utilized for the checking of parts of a mechanical piece with complex shape, more specifically a Head Stack Assembly ("HSA") 40. The HSA of FIGS. 1-2 is shown in a more detailed, though schematic, way in FIG. 3 and includes an E-block 42 with a plurality of wings 44. Thin plates 46 are coupled to the wings 44 and carry, at free ends, sliders 50. Other details of the HSA, as the read/write heads coupled to the sliders and the gimbals located between thin plates and sliders, are not shown in the figures for reasons of simplicity and clarity. The apparatus shown in FIGS. 1-2 is under many aspects similar to the apparatus described in EP-1029219-B1 (FIG. 1) and includes a base 1 to which there is coupled a displacement system with a longitudinal translation system 3 of a known type that defines a longitudinal axis and includes a support 5 fixed to the base 1 by means of screws. The support 5 carries a protection structure 4 whereupon a longitudinal slide 11 can translate. The protection structure 4 includes component parts of the longitudinal translation system 3, per se known and not shown in the figures, like driving devices with a first electric motor for translating the longitudinal slide 11 along the longitudinal axis by means of a feed screw and detecting devices with a first rotary transducer, or encoder, for providing signals relating to the position of the longitudinal slide 11 with respect to the base 1. The longitudinal slide 11 includes a movable beam 2, that can slide along the protection structure 4, to which there is coupled a rest plate 6 for supporting two stanchions 8, 10. First end portions of two guide spindles 14, 16 are coupled to the stanchion 8, while second end portions are coupled to the stanchion 10. Two component parts with bushings 18, 20 are coupled to the guide spindle 14, while a third component part with a bushing 22 is coupled to the guide spindle 16. The component parts 18, 20, 22 are coupled, for example by means of screws, to a first side of a movable table 28, that is part of a displacement system, more specifically a transversal translation system 9 defining a translation axis that is transversal, more specifically perpendicular, to the longitudinal axis. The transversal translation system 9 includes associated driving devices with a second electric motor 24 coupled to the stanchion 8, other detecting devices with a second transducer (not shown in the figures), and a transmission mechanism including a joint 30, coupled to the motor 24, that carries a worm screw 32 integral with the joint 30 and a threaded component or lead nut 34 coupled to the worm screw 32. A coupling element 36, coupled to the lead nut 34, is fixed to the movable table 28. The second electric motor 24 causes the worm screw 32 to rotate about its axis in either direction and, consequently, the lead nut 34 to translate along the translation axis. As a consequence, the movable table 28 can translate along the guides provided by the spindles 14, 16 with respect to the stanchions 8, 10 of the slide 11. The stanchions 8, 10 also carry position sensors 38 of a known type, as an example of the inductive or optical type, that detect the reaching of limit stop positions of the movable table 28 in the course of the displacement along the translation axis. The position sensors 38 cooperate in a known way with an element integral with the coupling element 36.

At a second side of the movable table 28 there is coupled, for example by means of screws, a rotary table 13 that is part of a displacement system, more specifically a rotation system 26, and defines a longitudinal axis of rotation. A substantially C-shaped support 15 for detecting devices including an optoelectronic measuring system 53 is fixed, for example by means of screws, at a central part 17 (of the support 15), to the rotary table 13 and carries the component parts of the optoelectronic measuring system 53 at free ends 19, 21. The optoelectronic measuring system 53 is of the known shadow casting type, for example like the one described in EP-1029219-B1, and includes an emitter 54 for generating a beam of light and a receiver 55 for receiving the light and generating corresponding electric signals.

Moreover, the rotation system 26 includes associated driving devices with a third motor 27 that causes rotations of the rotary table 13 about the longitudinal axis of rotation. Small rotational displacements of the rotary table 13 in a clockwise and counterclockwise direction (swinging) enable the ends 19, 21 of support 15 and, thus, the component parts of the optoelectronic measuring system 53 integral with them to oscillate in a plane Y-Z substantially perpendicular to the axis of rotation of the rotary table 13. Possible oscillations of the support 15 in a clockwise and counterclockwise direction can be limited, in a per se known way that is not shown in the drawings, by suitable adjustable, mechanical references fixed to the slide 11, or by known devices located at the interior of the rotary table 13. Additional detecting devices including a third rotary transducer 29, for providing signals depending on the angular position of the rotary table 13 and thus of the optoelectronic measuring system 53, are coupled to the motor 27.

The electric motors, the transducers and the component parts of the optoelectronic system 53 are connected, in a known way represented in simplified form in the figures by a conductor C, to a processing unit including power supply, control and display functions, schematically shown in FIGS. 1 and 2 and identified by reference number 25.

The HSA 40 is fixed to a locking and reference system 31 of a known type. As shown in FIG. 1, the locking and reference system 31, including a worktable 49, is coupled to the base 1, for example by means of screws, and can have different shape and structure, e.g. depending on the dimensions and on the shape of the piece to be checked, as described and illustrated, for example, in EP-1029219-B1.

Figure 3:
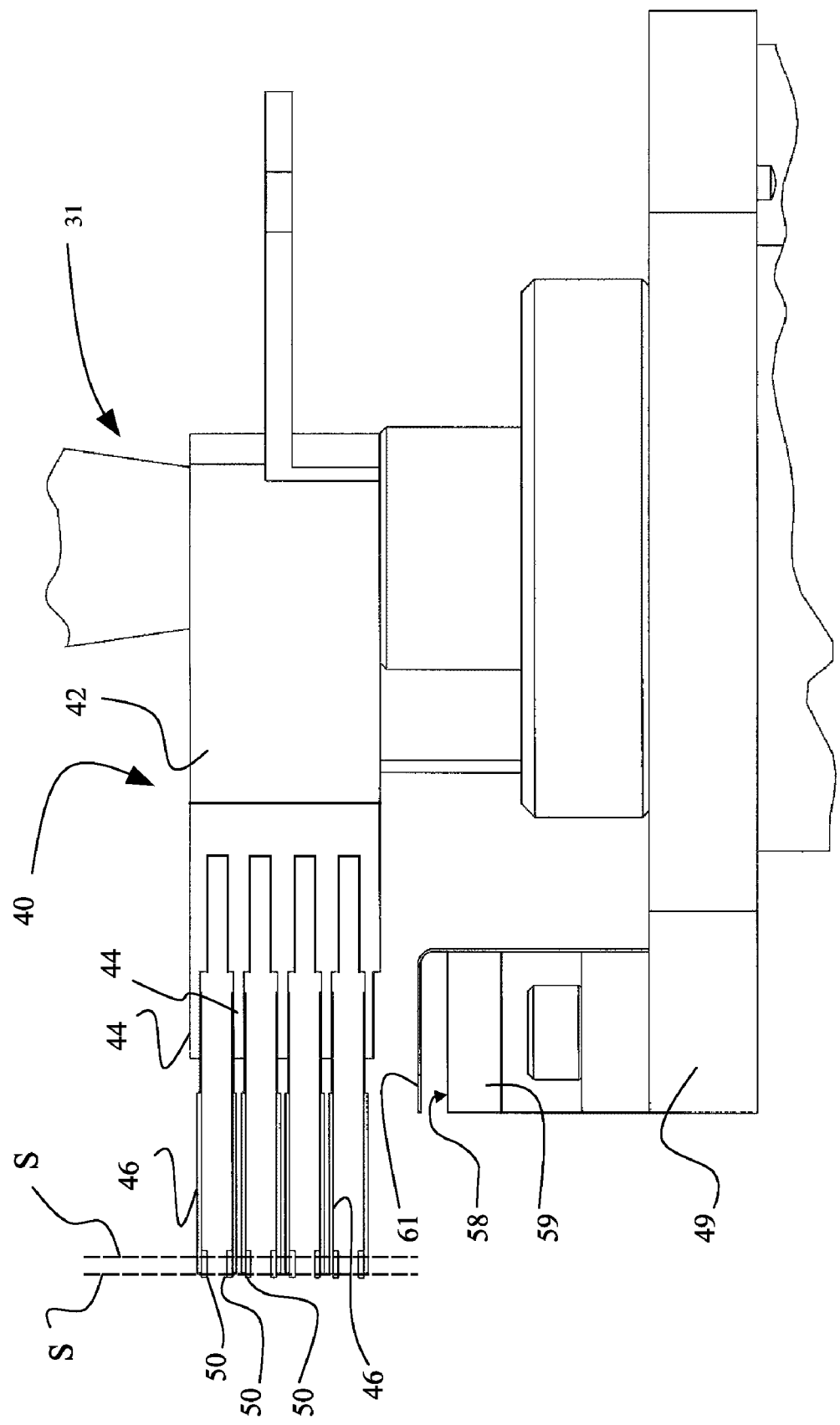
FIG. 3 is an enlarged scale side view of a detail of FIG. 1, shown along the direction III in FIG. 1.

FIG. 3 shows some details of the locking and reference system 31, like a reference block 59, fixed to the worktable 49, including a surface 58 that defines a reference plane r for the optoelectronic measuring system 53. A protection element 61 protects the reference block 59 from dust or other foreign matter that may deposit on the surface 58 and hence prevent the optoelectronic system 53 from properly detecting the reference plane.

The locking and reference system 31 identifies and fixes the position of the HSA 40 to be checked, more specifically with respect to the reference plane r.

The operation of an apparatus according to the invention for the checking of the sliders 50 of the HSA 40 is now described with reference to FIGS. 3-7.

The apparatus disclosed in the present invention can be utilized for checking the height and the spatial arrangement or attitude (inclination angles about different axes, or "roll" and "pitch") of each slider 50 coupled to its associated thin plate 46. As previously mentioned, these features are of importance for a correct read/write process.

The HSA 40 is fixed to the locking and reference system 31 in such a way that the thin plates 46 lie on planes that are substantially parallel to the longitudinal axis and to the translation axis.

For the sake of clarity, the operation of the optoelectronic apparatus is hereinafter disclosed by describing first the checking of a slider 50 according to a method that utilizes known parts of the apparatus, and describing then the new method of checking by means of the apparatus according to the invention.

Figure 4:
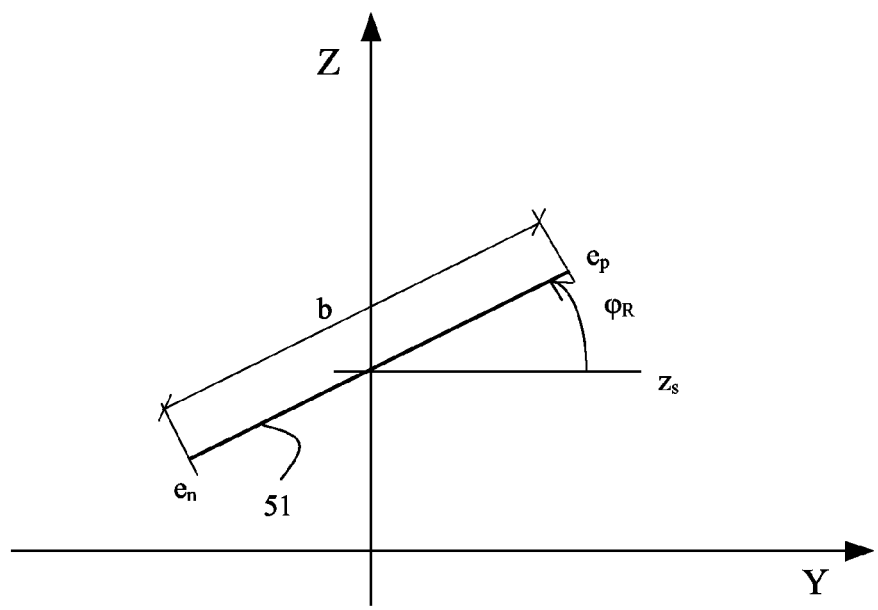
FIG. 4 is a simplified graphical representation of the intersection between a surface of a slider for hard disk and a plane Y-Z.

FIG. 4 shows, in simplified form, the intersection line—on plane Y-Z of a reference system XYZ integral with the optoelectronic system 53—of a substantially plane surface 51 of one of the sliders 50 shown in FIG. 3, corresponding for example to the upper face (obviously, the checking can be carried out in the same way with reference to the lower face and to the associated surface). The surface 51 has transversal dimension b. In such reference system, the X axis is parallel to the longitudinal axis of rotation and lies on the reference plane r, the Y axis is parallel to the beam of light and the Z axis is perpendicular to both.

In the figure the external sides (or edges) of the surface 51 are indicated by two points, $e_p$ and $e_n$.

Translations of the longitudinal slide 11 are controlled by the first electric motor and associated encoder, housed in the structure 4, and they are stopped upon the reaching of a position in which the optoelectronic measuring system 53 is at a transversal section plane S1 (shown in FIG. 3)—lying substantially in the plane of FIG. 4—in which it is required to carry out the checkings of the slider 50.

The third motor 27 controls small rotation displacements, in a clockwise and in a counterclockwise direction, of the rotary table 13 about the axis of rotation, by making the component parts of the optoelectronic measuring system 53 oscillate substantially in the section plane S1 corresponding to the one of FIG. 4. In the course of such rotation displacements, the optoelectronic measuring system 53 detects the spatial position of the slider 50, more specifically of the associated surface 51, for example with respect to the reference plane r defined by the surface 58 of the reference block 59 and the detected data are processed by the processing unit 25.

On the basis of the signals provided by the receiver 55 of the optoelectronic system 53 and by the rotary transducer 29, the height $z_p$ of the point $e_p$ can be defined as a function of the angle of rotation (or swinging) θ of the optoelectronic system 53. Under the hypothesis that the axis of rotation includes the middle point of the surface 51 in the cross-section under consideration shown in FIG. 4, the height $z_p$ can be expressed as:

$$z_p(\theta) = \frac{b}{2} \times sen(\theta) + z_{p0} \quad (1)$$

where $z_{p0}$ is the height z of the point $e_p$ at the angle θ=0.

The slider 50 and the optoelectronic system 53 perform small mutual oscillations with respect to an initial position, the oscillations being included between an angle $-\theta_k$ and an angle $+\theta_k$. As known, for small angles the sine of the angle substantially corresponds to the value of the angle in radians and the equation (1) can be simplified as follows:

$$z_p(\theta) = \frac{b}{2} \times \theta + z_{p0} \quad (2)$$

An analogous equation (3) can be considered for the point $e_n$:

$$z_n(\theta) = -\frac{b}{2} \times \theta + z_{n0} \quad (3)$$

where $z_{n0}$ is the height z of the point $e_n$ at the angle θ=0.

Figure 5:
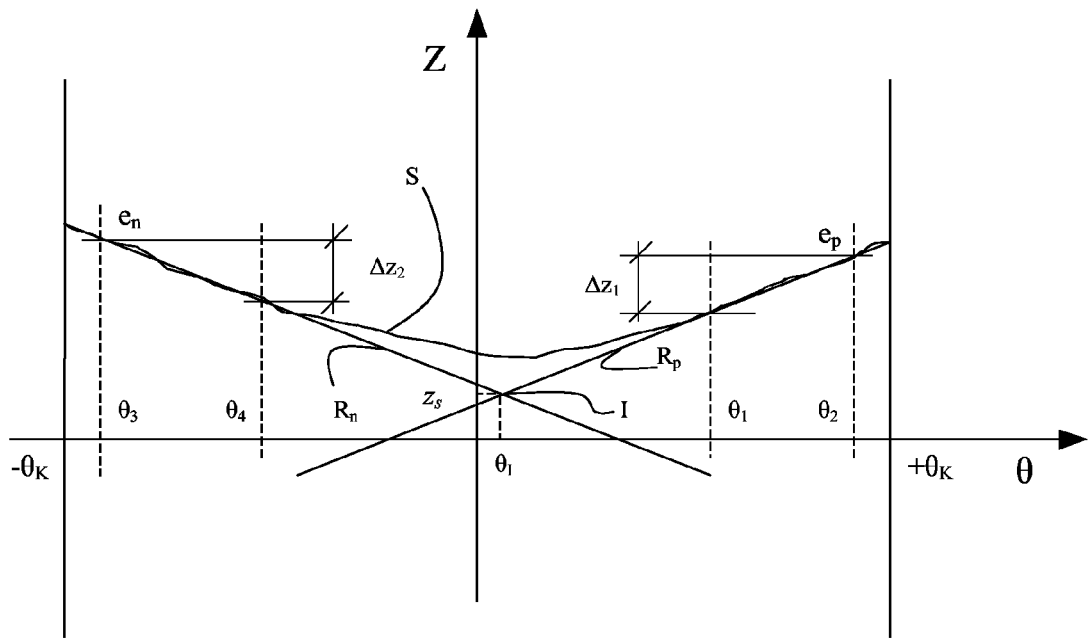
FIG. 5 is a graph schematically showing theoretical and actual trends of signals provided by the receiver of a known apparatus.

On a plane θ-Z shown in FIG. 5, the equations (2) and (3) are represented by straight lines $R_p$ and $R_n$ that meet at a point of intersection I. It is assumed that the system has previously been properly calibrated, so that the condition whereby the beam of light of the optoelectronic system 53 is parallel to the reference surface r corresponds to the value θ=0 and the height of the reference plane r corresponds to the value z=0.

The point I represents the condition according to which the point $e_p$ and the point $e_n$ have identical height $z_s$, that is to say they are both aligned to the beam of light of the optoelectronic system 53. The value $z_s$ indicates the height of a central portion of the surface 51 with respect to the plane r. The angle $\theta_I$ corresponding to this condition represents the inclination $\phi_R$ of the surface 51 of the slider 50 about the X axis (see FIG. 4) with respect to the reference plane r, and is defined as roll angle. Such angle contributes to define the spatial arrangement or attitude of the slider 50 and, in order to guarantee a proper read/write process of the head over its associated disk, it must have a substantially null value.

In actual fact, the signal provided by the optoelectronic system 53 is affected by noise and the corresponding curve representing the height z of the points $e_p$ and $e_n$ depending on the angle θ does not coincide with portions of the straight lines $R_p$ and $R_n$. Moreover, there is a greater influence of the optical noises at the point of intersection I, when beam of light and surface 51 are substantially aligned and signals relating to the opposite surfaces of the slider 50 (upper and lower surfaces) are mixed up and hardly distinguishable. The curve S shown in FIG. 5 shows a typical trend of the signal that has actually been provided.

Owing to the above mentioned noise, the point of intersection I is obtained as the intersection of straight lines obtained by processings including linear regression on the basis of values of the signals provided by the optoelectronic system 53 in limited swinging intervals in which the noises are expectantly negligible. More specifically, the first straight line is obtained through regression processing of the data relating to the point $e_p$ detected in a first limited interval. The data used for the processing are those with greater z, that is to say farthest away from point I to be determined (to which there correspond angular values in the interval $\theta_1$-$\theta_2$ closer to $+\theta_k$), data that are presumably less affected by noise. A similar processing is performed for the second straight line, that is obtained from data relating to the point $e_n$ detected in a second interval, more specifically the data with greater z (to which there correspond angular values in the interval $\theta_3$-$\theta_4$ closer to $-\theta_k$).

Upon the decrease of the transversal dimension b of the surfaces 51 of the sliders 50 and at identical swinging angle, the variation of light intercepted by the slider 50 and corresponding variations of the dimension z decrease. In the graph shown in FIG. 5, this implies a minor slope of the straight lines $R_p$ and $R_n$ and a decrease of the variability interval of z in the detected intervals ($\theta_1$-$\theta_2$ and $\theta_3$-$\theta_4$). In other terms, the "dynamics" of the signal provided by the receiver 55 decreases.

For example, in the case of sliders with transversal dimension b in the order of one millimeter and relative rotations between the slider 50 and the optoelectronic system 53 that do not exceed 10°, the height of the useful intervals (shown in simplified form and identified by references $\Delta z_1$ and $\Delta z_2$ in FIG. 5) is of few tens of μm.

Therefore, if the transversal dimension b of the slider to be checked is very small, the amplitude of the interval of the reliable data can be too small and not allow sufficiently accurate and repeatable processings. With reference to the specific processing, the determining of the point of intersection I, and thus of the dimension $z_s$ and of the roll angle $\theta_I$, can be difficult.

In order to broaden the variation interval of z, it can be envisaged to increase the amplitude of the rotation between the piece 40 and the optoelectronic system 53. However, this solution is not always possible, for example in consideration of the mechanical layout dimensions of the apparatus in the course of the rotation, of the possibility that the slider 50 be "hidden" to the optoelectronic system 53 by other component parts in the course of the rotation, or by problems bound to the focusing of the optoelectronic system 53.

A method of checking performed by the apparatus according to the present invention foresees that once the position of the slide 11 along the longitudinal axis is defined, in addition to the oscillation displacements of the rotary table 13, there be also controlled displacements along the translation axis of the movable table 28, to which the rotary table 13 is coupled, between a first and a second transversal end position. The displacements of the table are controlled by the motor 24, the previously described transmission mechanism and the position sensors 38.

Figure 6:
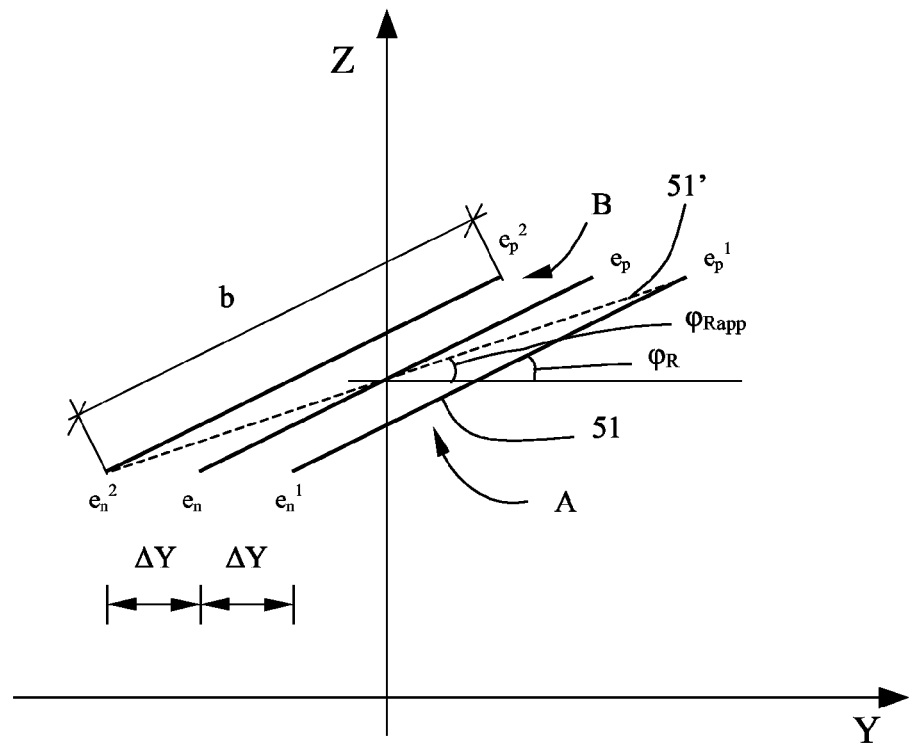
FIG. 6 is a simplified graphical representation of the intersection between a surface of a slider for hard disk, at different transversal positions, and a plane Y-Z.

FIG. 6 shows, in simplified form by a continuous line, the cross section of the surface 51 of the slider 50 on the same section plane S1 of FIG. 4 at three positions: a first transversal end position A, a second central position, and a third transversal end position B in a reference system XYZ integral with the optoelectronic system 53 and defined as in FIG. 4.

As in the previously described case, reference is hereinafter made to the surface 51 of the upper face as an example only, and the checking can be carried out in the same way with reference to the lower face and to its associated surface.

Figure 7:
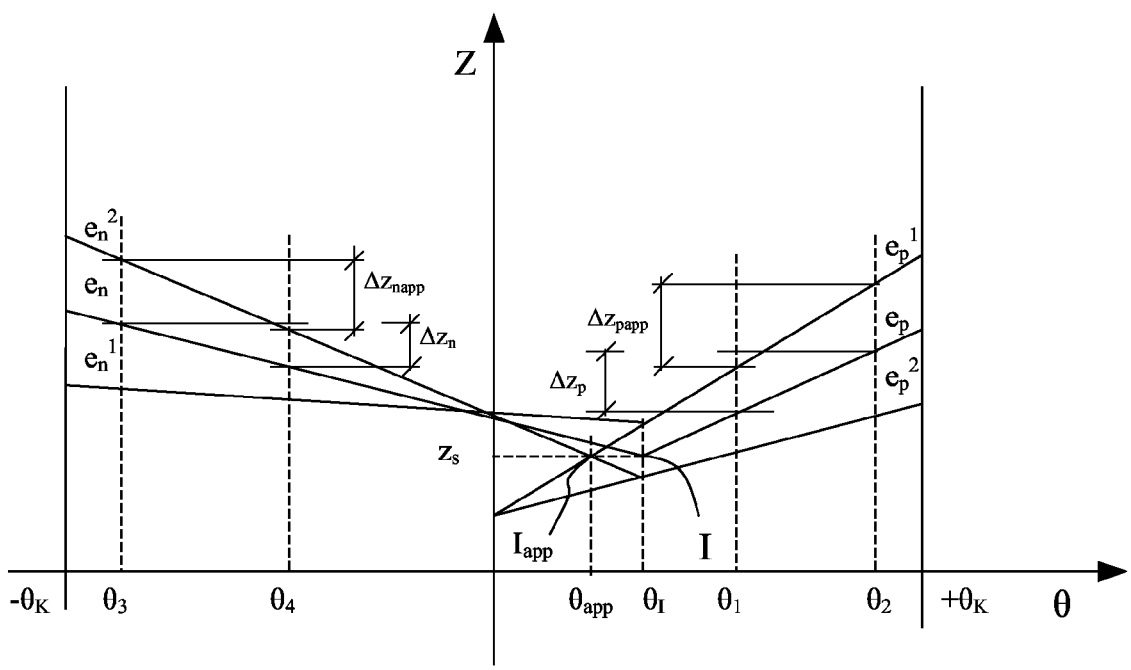
FIG. 7 shows, in graphical form, the trend of signals provided by the receiver of an apparatus according to the invention.

With respect to the reference system XYZ, the slider 50 is translated from the central position along the Y axis both in a positive and in a negative sense, for example by an identical amount $\Delta Y$, towards the transversal end positions A and B that are consequently located at identical distances and at opposite sides with respect to the transversally centered position. By virtue of the translation displacements along the Y axis, the surface 51 forms an identical roll angle $\phi_R$ with the Y axis both in the central position, and in the transversal positions A and B. The relative translation and the swinging between the slider 50 and the reference system XYZ are implemented, in the embodiment shown in FIGS. 1 and 2, by translation and rotation displacements of the optoelectronic system 53 that defines the reference system. At each of the transversal positions A and B, there are performed one or a plurality of swinging cycles between the optoelectronic system 53 and the slider 50, and acquired values relating to the spatial position of the points $e_p^1$, $e_n^1$ and $e_p^2$, $e_n^2$, that define the ends of the surface 51 in the transversal positions A and B, respectively. The graph of FIG. 7 shows the theoretical trend of values z detected by the optoelectronic system 53 as the swinging angle θ varies and representing the position of the points $e_p^1$, $e_n^1$ and $e_p^2$, $e_n^2$. Although the optoelectronic system 53 typically does not detect the ending edges of the surface 51 when the latter is in a central position, for reasons of clarity the graph of FIG. 7 also shows the theoretical trend of values z as a function of the swinging angle θ of the points $e_p$ and $e_n$, that is to say of the ends of the surface 51 in central position.

The detecting of values relating to the surface 51 of the slider 50 at the transversal end positions A and B enables to acquire the spatial position of a fictitious, "virtual" slider, whose upper face (in the specific example) has virtual surface 51' with transversal dimension $b_{app}$ (longer than that of the real slider) and with ending points $e_p^1$, $e_n^2$, that forms an "apparent roll" angle $\phi_{Rapp}$ with Y axis.

The value of the apparent roll angle corresponds to the coordinate $\theta_{app}$ of the point $I_{app}$ of intersection of the theoretical straight lines of FIG. 7 representative of the ending points $e_p^1$, $e_n^2$. The height of a central portion of the surface 51' of the virtual slider corresponds to the coordinate $z_s$ of the point $I_{app}$.

The angle $\phi_{Rapp}$ that the virtual surface 51' forms with the Y axis can be expressed as:

$$\phi_{Rapp} = \arcsen(\Delta z_{app}/b_{app}) \quad (4)$$

where $\Delta z_{app}$ is defined as difference in height between the point $e_p^1$ and the point $e_n^2$.

In an entirely identical way, the angle $\phi_R$ that the surface 51 of the slider 50 forms with the Y axis can be expressed as:

$$\phi_R = \arcsen(\Delta z_{real}/b) \quad (5)$$

where $\Delta z_{real}$ is defined as difference in height between the point $e_p$ and the point $e_n$.

As the swinging angles are small, the arcsen function of the angle substantially corresponds to the angle and the equations (4) and (5) can be simplified to obtain the following equations (6) and (7), respectively:

$$\phi_{Rapp} \cong \Delta z_{app}/b_{app} \quad (6)$$

and $$\phi_R \cong \Delta z_{real}/b \quad (7)$$

As the slider 50 performs translation displacements along the Y axis, the points $e_p^1$ and $e_p$ are of identical height, as well as the points $e_n^2$ and $e_n$. As a consequence, their differences are identical, that is:

$$\Delta z_{app} = \Delta z_{real} \quad (8)$$

and the roll angle $\phi_R$ can be expressed as:

$$\phi_R = \phi_{Rapp} \times b_{app}/b \quad (9)$$

The graph of FIG. 7 also shows the point I, of coordinates $\theta_I$ and $z_s$, defined by the intersection of the theoretical straight lines that represent the points $e_p$ and $e_n$. Positions of points I and $I_{app}$ in FIG. 7 show that the surface 51 of the slider 50 and the virtual surface 51' lie at the same height $z_s$.

The advantages obtainable by the present invention are evident, more specifically those consequent to the possibility of mutually translating the slider and the optoelectronic system 53 along Y axis, and acquiring values relating to the position of the surface 51 at two positions A and B, that are distant, for example, $\Delta Y$ from the central position in one sense or in the other. In fact, the theoretical straight lines representative of the points $e_p{}^1$ and $e_n{}^2$, i.e. of the ends of the virtual surface 51', have greater angular coefficient (in absolute value) than the theoretical straight lines representative of the points $e_p$ and $e_n$, respectively. This enables to increase, for an identical angular interval, the variability interval of the corresponding values detected by the optoelectronic system 53 and thus obtain more reliable data for processing the regression straight lines. More specifically, in the interval $\theta_3$-$\theta_4$, the variability interval of z along the straight line that represents the point $e_n{}^2$ (indicated in FIG. 7 by the reference $\Delta z_{n_{app}}$) is greater than the variability interval of z along the straight line that represents the point $e_n$ (reference $\Delta z_n$). In the same way, in the interval $\theta_1$-$\theta_2$, the variability interval of z along the straight line that represents the point $e_p{}^1$ (indicated by the reference $\Delta z_{p_{app}}$) is greater than the variability interval of z along the straight line that represents the point $e_p$ (reference $\Delta z_p$).

In other words, the displacing of the ends of the surface 51 of the slider 50 away from the axis of rotation of the optoelectronic measuring system 53, obtained by means of mutual translations along the Y axis in a sense and in the other, enables to amplify the dynamics of the signal provided by the receiver 55 without the use of electric or electronic amplification means.

In this way, both the height $z_s$ and the roll angle $\phi_R$ can be determined—the latter through a very simple mathematical process—with great accuracy and repeatability even in the case of pieces with very small transversal extension.

The present invention makes it possible to check even other surface features of the sliders 50 as, for example, the pitch, by carrying out two subsequent swinging cycles at two distinct section planes S1 and S2 (shown in FIG. 3).

In the example that refers to the surface 51, after the first checking performed at section plane S1, the optoelectronic system 53 is displaced along the longitudinal axis by means of the translation system 3 and stopped at the desired section plane S2. Thus the pitch value is obtained by dividing the difference in height of the surface 51 of the slider 50 taken into consideration obtained at S1 and S2 by the distance between the section planes S1 and S2.

Equivalent results can be obtained by locking the optoelectronic system 53 with respect to the base 1 and by making the locking and reference system 31, that carries the piece to be checked, transversally translate and rotate about the axis of rotation. It is likewise possible that some displacements be performed by the component part carrying the slider 50 and other displacements be performed by the optoelectronic system 53.

In substance the present invention covers many embodiments according to which the mechanical piece to be checked and the optoelectronic measuring system 53 can perform in any event mutual swinging displacements about the longitudinal axis and translation along the translation axis.

Relative swinging displacements between the mechanical piece and the optoelectronic system 53 typically occur just at the transversal end positions A and B in which the position of the edges of the surface 51 of the slider 50 is acquired, but they can also be implemented in a continuous way in the course of the transversal displacement from one position to the other.

As hereinbefore stated, in the present description of a checking method according to the invention it has been assumed, for the sake of providing simplicity and clarity to the exposition, that when the slider 50 lies in a central position on the translation axis, the middle point of the surface 51 in the considered section lies on the longitudinal axis of rotation. Even where this basic condition does not physically occur, it is in any case always possible to refer to it for implementing the checking method according to the invention and to take into account and to compensate for the different arrangement by means of simple known mathematical processes, typically implemented by software.

The present invention also covers checking methods according to which the acquisitions relating to the ends of the surface 51 of the slider 50 occur at transversal end positions A and B that are not equally equidistant with respect to the central position. In other words, the optoelectronic system 53 and the slider 50 can be made to mutually translate along the Y axis by a certain amount in a positive sense, and by a different amount in a negative sense.

Moreover, it is possible to simultaneously check a plurality of pieces, for example by detecting the edges of the surfaces 51 of different sliders 50 coupled to a same E-block in the course of the swinging.

As hereinbefore described, the apparatus and the method according to the present invention are particularly useful for checking pieces with small dimensions, as sliders of HSA, but can certainly be utilized for checking even other parts of the HSA, as for example the wings 44 and the thin plates 46 or any other mechanical piece with at least one substantially plane surface.

An apparatus and a method according to the invention provide great advantages even in the checking of mechanical pieces with larger dimensions. In fact, the checking of mechanical pieces of any dimension is improved by the widening of the dynamics of the signals to be processed, this widening being advantageously achieved without the utilization of electric or electronic amplification means.

The invention claimed is:

1. An optoelectronic apparatus for checking position and/or shape of a mechanical piece with at least one substantially planar surface, the apparatus comprising:
    a base,
    a locking and reference system adapted to define and fix the position of said at least one substantially planar surface of the piece to be checked with respect to a reference plane,
    detecting devices with an optoelectronic system for providing signals indicative of the position of said at least one substantially planar surface of the piece to be checked,
    a rotation system with a substantially C-shaped support carrying the optoelectronic system and enabling swinging displacements of the optoelectronic system about a longitudinal axis of rotation, the C-shaped support having free ends adapted to perform said swinging displacements, the optoelectronic system comprising an emitter and a receiver coupled to said free ends of the substantially C-shaped support,
    a processing unit adapted for receiving said signals of the optoelectronic system and providing information relating to the position and/or the shape of said at least one substantially planar surface of the piece to be checked, and
    a transversal translation system defining a translation axis, transversal with respect to said longitudinal axis of rotation, and enabling translation displacements along said translation axis between the optoelectronic system and the piece to be checked, between different mutual transversal positions at a same transversal section plane.

2. The apparatus according to claim 1, wherein the optoelectronic system provides signals relating to said at least one substantially planar surface, the transversal translation system being adapted to enable translation displacements along said translation axis between the optoelectronic system and said at least one substantially planar surface.

3. The apparatus according to claim 1, wherein said locking and reference system is coupled to the base.

4. The apparatus according to claim 1, wherein the optoelectronic system is coupled to the transversal translation system.

5. The apparatus according to claim 1, wherein the rotation system includes a rotary table, the optoelectronic system being coupled to the rotary table.

6. The apparatus according to claim 5, wherein said rotary table is coupled to the transversal translation system.

7. The apparatus according to claim 5, including a support coupled to the rotary table, the optoelectronic system including an emitter and a receiver coupled to free ends of said support.

8. The apparatus according to claim 7, wherein the optoelectronic system is of the shadow casting type.

9. The apparatus according to claim 1, wherein said translation axis is perpendicular to said longitudinal axis of rotation.

10. The apparatus according to claim 1, wherein the rotation system and the transversal translation system include associated driving devices and associated detecting devices, connected to said processing unit.

11. The apparatus according to claim 1, including a longitudinal translation system that defines a longitudinal axis perpendicular to the translation axis, the longitudinal translation system being adapted to enable mutual translation displacements along said longitudinal axis between the piece and the optoelectronic system.

12. The apparatus according to claim 11, wherein the longitudinal translation system includes associated driving and detection devices connected to said processing unit.

13. The apparatus according to claim 1, including a reference block rigidly coupled to the locking and reference system for the piece to be checked, the reference block including a surface that defines said reference plane for the optoelectronic system.

14. A method for checking the position and/or shape errors of a mechanical piece with at least one substantially planar surface, by means of an apparatus including a locking and reference system for the piece to be checked, detecting devices for providing signals indicative of the position of said at least one substantially planar surface of the piece to be checked, and driving devices between said locking and reference system and said detecting devices, the method including the steps of
  causing said detecting devices to oscillate with respect to said locking and reference system about an axis of rotation,
  causing mutual translations between the piece to be checked and the detecting devices along a translation axis, transversal with respect to said axis of rotation,
  providing signals by the detecting devices while detecting devices and locking and reference system mutually oscillate at at least two different mutual transversal positions of a same transversal section plane, between the piece to be checked and the detecting devices, and
  processing said signals provided by the detecting devices in order to obtain information relating to the position and/or the shape of said at least one substantially planar surface of the piece to be checked, said processing step including processing a virtual surface obtained by combining the signals relating to said at least one substantially planar surface provided at each of said at least two mutual transversal positions.

15. The method according to claim 14, wherein said at least two mutual transversal positions between the piece to be checked and the detecting devices are at opposite sides with respect to a central, transversally centered, position.

16. The method according to claim 15, wherein said at least two mutual transversal positions between the piece to be checked and the detecting devices are at equal distances from the transversally centered position.

17. The method according to claim 14, for checking by means of an apparatus wherein said detecting devices include an optoelectronic system adapted to provide said signals indicative of the position of said at least one substantially planar surface of the piece to be checked.

18. The method according to claim 14, including the additional step of causing mutual translation displacements between said locking and reference system and said detecting devices along a longitudinal axis parallel to the axis of rotation and stopping said displacements at at least one transversal section plane, said signals being provided by the detecting devices at said at least one transversal section plane.

19. The method according to claim 14, for checking the spatial arrangement of at least one slider for hard disk storage units, wherein the mechanical piece locked and referred by the locking and reference system has a complex shape and carries said at least one slider.

20. The method according to claim 14, including the additional step of causing mutual translation displacements between said locking and reference system and said detecting devices along a longitudinal axis parallel to the axis of rotation and stopping said displacements at two transversal section planes, said signals being provided by the detecting devices at each of said two transversal section planes.

21. An optoelectronic apparatus for checking the spatial arrangement of at least one slider for hard disk storage units defining a substantially planar surface and being coupled to a mechanical piece, the apparatus comprising:
  a base,
  a locking and reference system for the mechanical piece, coupled to the base and adapted to define and fix the position of the substantially planar surface of said at least one slider with respect to a reference plane,
  detecting devices with an optoelectronic system for providing signals indicative of the position of said substantially planar surface,
  a rotation system with a substantially C-shaped support carrying the optoelectronic system and enabling swinging displacements of the optoelectronic system about a longitudinal axis of rotation, the C-shaped support having free ends adapted to perform said swinging displacements, the optoelectronic system comprising an emitter and a receiver coupled to said free ends of the substantially C-shaped support,
  a processing unit adapted for receiving said signals of the optoelectronic system and providing information relating to the position and/or the shape of said substantially planar surface, and
  a transversal translation system defining a translation axis, transversal with respect to said longitudinal axis of rotation, carrying said rotation system and enabling translation displacements along said translation axis between the swinging optoelectronic system and the piece to be checked.

* * * * *